(12) United States Patent
Pathikonda et al.

(10) Patent No.: US 11,916,770 B2
(45) Date of Patent: Feb. 27, 2024

(54) PINPOINTING SOURCES OF JITTER IN NETWORK FLOWS

(71) Applicant: Cisco Technology, Inc., San Jose, CA (US)

(72) Inventors: Padmanab Pathikonda, Mountain House, CA (US); Rishi Chhibber, Dublin, CA (US); Roshan Lal, San Jose, CA (US); Lakshmi Priya Sarma, Milpitas, CA (US); Vinay Narayana Rai, San Jose, CA (US); Akash Garg, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 52 days.

(21) Appl. No.: 17/075,485

(22) Filed: Oct. 20, 2020

(65) Prior Publication Data

US 2022/0124017 A1    Apr. 21, 2022

(51) Int. Cl.
*H04L 43/087*     (2022.01)
*H04J 3/06*        (2006.01)
*H04L 43/065*     (2022.01)

(52) U.S. Cl.
CPC ......... *H04L 43/087* (2013.01); *H04J 3/0661* (2013.01); *H04L 43/065* (2013.01)

(58) Field of Classification Search
None
See application file for complete search history.

(56) References Cited

U.S. PATENT DOCUMENTS

| | | | | |
|---|---|---|---|---|
| 7,746,812 | B2* | 6/2010 | Bhukania | H04J 3/0608 370/310 |
| 8,228,923 | B1* | 7/2012 | Jain | H04L 47/28 370/510 |
| 9,054,967 | B1* | 6/2015 | Edsall | H04L 43/106 |
| 9,264,370 | B1* | 2/2016 | Ahn | H04L 43/12 |
| 9,838,326 | B2* | 12/2017 | Birlik | H04L 65/80 |
| 10,284,460 | B1* | 5/2019 | Bshara | H04L 45/26 |
| 10,972,358 | B2* | 4/2021 | Papaloukopoulos | G06N 20/00 |
| 2009/0304128 | A1* | 12/2009 | Izumi | H04L 7/042 375/343 |
| 2010/0269044 | A1* | 10/2010 | Ivanyi | H04L 67/306 709/224 |
| 2011/0165851 | A1* | 7/2011 | Harada | H04B 17/382 455/226.1 |
| 2015/0236933 | A1* | 8/2015 | Edsall | H04L 43/0852 370/252 |
| 2016/0302166 | A1* | 10/2016 | Dang | H04L 65/611 |
| 2017/0078176 | A1* | 3/2017 | Lakshmikantha | H04L 45/64 |
| 2017/0339651 | A1* | 11/2017 | Dang | H04W 56/001 |
| 2018/0206136 | A1* | 7/2018 | Chow | H04L 43/0888 |
| 2019/0044867 | A1* | 2/2019 | Chang | H04L 45/38 |
| 2019/0044879 | A1* | 2/2019 | Richardson | H04L 47/624 |

(Continued)

*Primary Examiner* — Kodzovi Acolatse
*Assistant Examiner* — Anindita Sen
(74) *Attorney, Agent, or Firm* — Lee & Hayes, P.C.

(57) ABSTRACT

This disclosure describes methods to process timing information of flows in a network. One or more processors determine a latency associated with each of one or more packets of a flow passing through a device. The one or more processors determine that the latency is greater than a baseline latency, and the one or more processors provide a message indicating at least the flow and that the latency is greater than the baseline latency.

20 Claims, 7 Drawing Sheets

(56) References Cited

U.S. PATENT DOCUMENTS

| | | | |
|---|---|---|---|
| 2019/0260568 A1* | 8/2019 | Pepper | H04L 7/0008 |
| 2019/0394676 A1* | 12/2019 | Gardner | H04W 28/021 |
| 2020/0389407 A1* | 12/2020 | Pasio | H04L 45/20 |
| 2021/0135923 A1* | 5/2021 | Tseng | H04L 25/0224 |
| 2022/0053361 A1* | 2/2022 | Thubert | H04W 28/0975 |

* cited by examiner

PINPOINTING SOURCES OF JITTER IN NETWORK FLOWS

TECHNICAL FIELD

The present disclosure relates generally to techniques for pinpointing sources of jitter in network flows.

BACKGROUND

Jitter is an important network flow characteristic. Jitter is a variation in the latency being experienced by a network flow. For example, if a network flow is video or other media, devices in the network may utilize buffer provisioning to handle network flows that are experiencing jitter, in order to that an end device may smoothly display or otherwise present the data of the network flow. For example, the end device may be configured to receive a video stream and display the video on a screen, including decoding the incoming video stream substantially in real time. For example, the end device may be a computer running a media streaming programming or the end device may be a specialized media stream playback device.

If the video and/or other media stream is experiencing a large amount of jitter relative to the size of the buffer, this may result in network devices underrunning or overrunning their buffers. Depending on the amount of jitter the video stream is experiencing, the end device may occasionally display a visual artifact or even a "black-screen." Similarly, if the media stream is audio, depending on an amount of the audio stream is experiencing, the end device may occasionally "skip" the audio playback.

For a network flow that is wholly within a single facility or that originates and terminates within a relatively small geography, the network flow may experience a relatively small amount of jitter. Furthermore, because such a transmission is relatively localized, the intervening network devices may be relatively straightforwardly configured, such as with buffering, to reliably transmit and handle the network flow without exhibiting artifacts of jitter. Furthermore, given the localized transmission, it may be straightforward for network administrators to isolate the source of, and correct for, unexpected jitter.

On the other hand, some network flows span a wide geography, through many intervening devices. As a result, any of a number of possible devices may introduce jitter into such a network flow. This may make it difficult for a network administrator to isolate the source of, and correct for, jitter that the network flow experiences. For example, the network administrator may perform a number of different tests to isolate the source of the jitter, so that the jitter can be addressed or otherwise accounted for.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
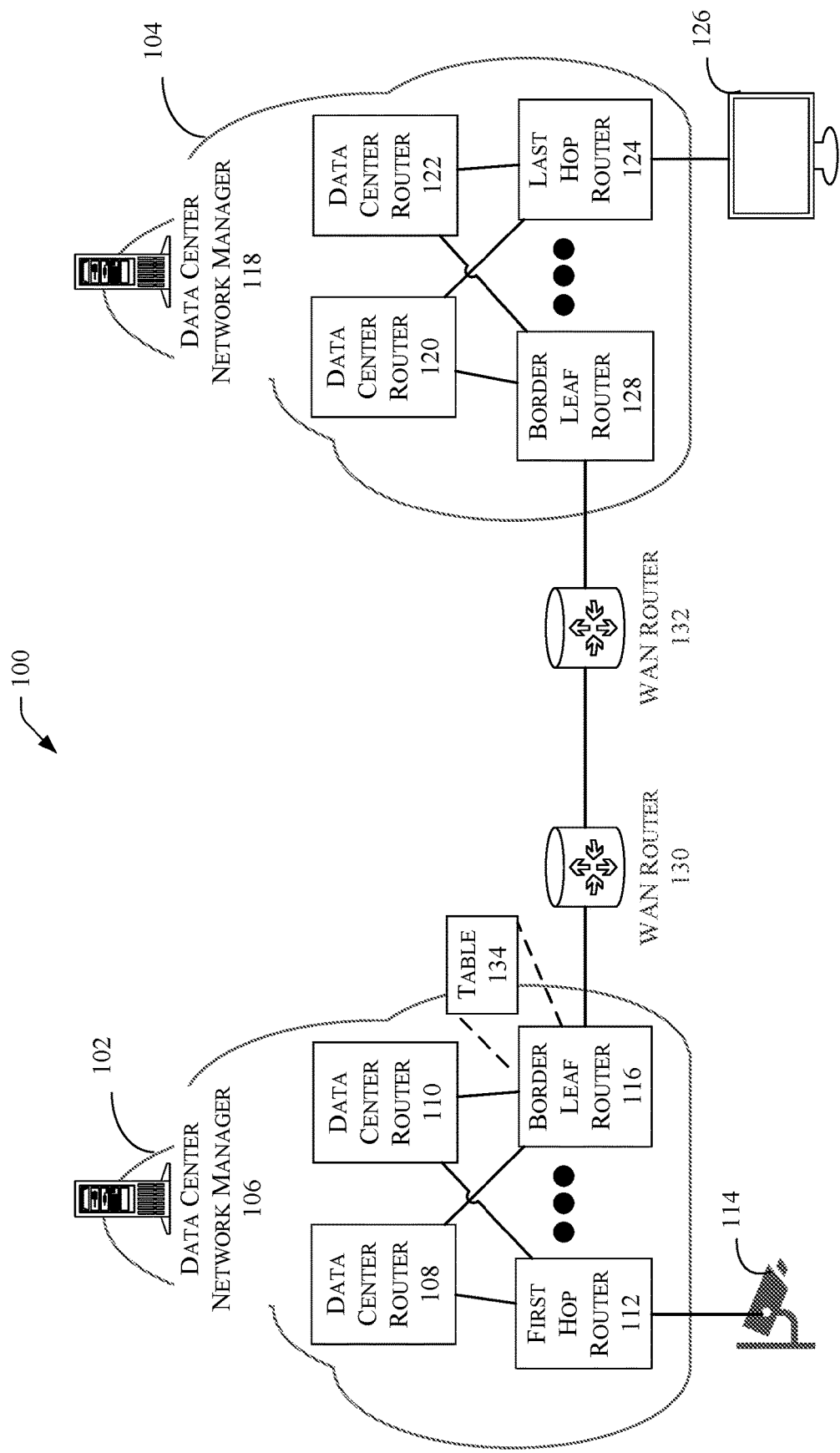
FIG. 1 is a diagram illustrating an architecture of an example system through which a data stream may be transmitted and forwarded along a path and having at least one device configured to store an indication of at least one packet for which the device is configured to determine an associated latency is above a threshold latency relative to a baseline latency.

This disclosure describes methods to process timing information of flows in a network. One or more processors determine a baseline latency based at least in part on a latency associated with a first subset of one or more packets of a flow passing through the intermediate device. The one or more processors determine a latency associated with a second subset of the one or more packets of a flow passing through a device. The one or more processors determine that the latency is greater than the baseline latency, and the one or more processors provide a message indicating at least the flow and that the latency is greater than the baseline latency.

Additionally, the techniques described herein may be performed by a system and/or device having non-transitory computer-readable media storing computer-executable instructions that, when executed by one or more processors, performs the methods described herein.

Example Embodiments

Latency is a measure of transmission delay between a source and a destination, such as in a network. For example, one-way latency may be determined by subtracting the time at which a packet (or information in another format) is transmitted from a source device from the time at which the packet (or information in another format) is received by a destination device. The source device and the destination device may have synchronized clocks, for example, which can aid in the determination of latency. Two-way latency, for example, may be determined by subtracting the time at which a packet (or information in another format) is transmitted from a source device from the time at which a response to the packet (or information in another format) is received from the destination device by the source device. For example, the response may be an acknowledgment transmitted by the destination device to the source device according to a particular communication protocol.

Ping is a tool that is sometimes used to measure latency. Ping is a utility that network administrators, typically, may use to determine whether a destination device on an Internet Protocol (IP) network is reachable. For example, the ping tool may measure the round-trip time for messages sent from a source device to a destination device, where the destination device echoes the ping information, received from the source device, back to the source device. For example, the source device may send Internet Control Message Protocol (ICMP) echo request packets to the destination device and wait for an ICMP echo reply message. The ping tool may report statistics characterizing the round-trip times, such as minimum, maximum, the mean round-trip times, and standard deviation of the mean.

Intermediate devices in the path between the source device and the destination device may be a contributor and/or sole cause of the latency. For example, a path of a packet between a source device and a destination device may include many intermediate devices, such as routers and/or other devices. Each intermediate device may delay the packet on the path from the source device to the destination device. As an example, an intermediate device may be experiencing congestion and, so, the intermediate device may be buffering packets that are passing through the intermediate device between the source device and the destination device. In some situations, the intermediate device may even drop a packet. This may necessitate retransmission of the dropped packet by the source device and/or by another intermediate device between the source device and the intermediate device in the patent of the dropped packet, depending on the communication protocol, for example.

Other causes of latency for a packet being transmitted from a source device to a destination device may include one or more operations being performed on the packet by one or more intermediate devices. For example, an intermediate device may convert data in the packet from one data format to another data format, such as converting an analog signal to a digital signal for services like Voice over Internet Protocol (VoIP). Other conversions may include transcoding different digital formats, converting frames to packets, converting a serial digital interface (SDI) to IP, and other conversions.

For many types of data being transmitted in packets, lower latency for the transmission is better than high latency. For example, if latency is too high, then a delay in transmission of a live or a simulated live data stream from a source device (such as a video camera) may be easily perceptible by users of the destination device (such as a display or media streaming playback device). For example, for a two-way audio/video conversation taking place with high latency, there may be a noticeable delay between a person on a first side of the conversation making an inquiry to a person on the second side of the conversation and the person on the first side of the conversation receiving a response to the inquiry from the person on the second side of the conversation. The latency may also affect communications not involving a person on one side or both sides of the communication, such as communication between a person and a machine or communication between two machines.

Furthermore, an even more pernicious issue may be related not directly to the latency itself, but to changes in the latency along a data path between a source device and a destination device. Changes in latency are referred to as jitter. For example, a small amount of jitter in a data path between a source device and a destination device may not be very detrimental, as devices in a network may be configured with a jitter buffer. A jitter buffer, for example, may be a temporary storage buffer in which an intermediate device in a data path captures incoming data packets. The intermediate device may use the jitter buffer to contribute to and/or accomplish continuity of data streams along the data path. The intermediate device may, for example, collect and store incoming packets of a data stream in a jitter buffer, and forward the packets out of the jitter buffer at evenly spaced intervals such that playback of the data stream at a destination device is smooth.

If the jitter is high along a data path, then a data stream along the data path may experience discontinuity during playback by the destination device, unless the intermediate devices in the data path have sufficient jitter buffer to smooth out the data stream. In some examples, where jitter is high along a data path, intermediate devices may buffer up to several hundred milliseconds of data to smooth out transmission and ultimate playback of the data stream. Buffering this amount of data in intermediate devices along a data path also leads to additional latency in transmission of a data stream along the data path, and the additional latency may have undesirable effects.

Therefore, it may be advantageous to provide tools and/or data from which a source of jitter along the data path may be determined, such as by a network administrator. For example, one or more of the intermediate devices along the data path may be configured to determine that latency experienced by one or more packets of a flow is above a threshold amount of latency relative to a baseline latency. For example, each intermediate device may determine a baseline latency for a particular flow. For example, the intermediate device may determine the latency for a number of packets of a flow, such as for a number of consecutive packets of a flow. The intermediate device may determine the baseline latency for the flow to be an average of the latencies determined, such as a mean, for the number of packets. The intermediate device may store the determined baseline latency in a hardware table of the intermediate device. Thus, for example, by determining the baseline latency in this way, the intermediate device need not know in advance or be configured with an expected baseline latency.

The intermediate device may, such as after determining the baseline latency for the flow, determine a latency for a subsequent packet of the flow. For example, the intermediate device may determine a latency associated with the subsequent packet by processing a time indicated by a "timestamp" field in a packet header, as well as processing a local time that may be provided by a local clock that is globally synchronized with a clock that provides the time in the timestamp field in the packet header. The intermediate device may determine the latency for the packet by subtracting the time indicted in the timestamp field in the packet header from the local time provided by the local clock. The intermediate device may populate the hardware table with data for the packet including the determined latency. The intermediate device may repeat the operation for each of some or all of subsequent packets of the flow.

The intermediate device may, in addition, characterize the jitter experienced by the one or more packets being handled by the intermediate device, at each of a number of intervals, such as at each of a number of query intervals. The intermediate device may characterize the jitter for the packets on a per-flow basis. A query interval may be, for example, an interval for which the intermediate device makes jitter indication reports to an administrator via a network. For example, the intermediate device may determine latency for packets of a particular flow, being handled by the intermediate device during the query interval, relative to the baseline latency determined for the flow. For example, the intermediate device may characterize the jitter by determining, for each packet of the query interval, a difference between the latency for the packet and the determined baseline latency for the flow to which the packet belongs.

Further, the intermediate device may build a report for the query interval, for the flow, that includes some or all of the determined differences. In some examples, the intermediate device may additionally or instead determine one or more statistics that represents the determined differences to, for example, represent the determined differences in a condensed manner. The intermediate device may include the one or more statistics in the report for the query interval in addition to or in place of including some or all of the determined differences. For example, the intermediate device may include a mean of the determined latency differences for the query interval, for each flow being handled by the intermediate device.

A central administrative device or other device may process the reports provided from various intermediate devices along the path of a flow to pinpoint a source of jitter for the flow.

The techniques described herein may be performed by a system and/or device having non-transitory computer-readable media storing computer-executable instructions that, when executed by one or more processors, performs the methods described herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 is a diagram illustrating an architecture of an example system 100 through which a data stream may be transmitted and forwarded along a path. Referring to FIG. 1, the system 100 includes a first site 102 and a second site 104. The first site 102 and the second site 104 may be deployed, for example, at different facilities of an enterprise. The different facilities may be spread apart from each other geographically, such as being in different cities or even in different countries. The system 100 is a simplistic example, and many systems have more than two sites, sometimes many more than two sites.

The first site 102, which may comprise a virtual local area network (vLAN), includes a data center network manager 106. The data center network manager 106 may, for example, be a platform for fabric-oriented configuration and operations management. The data network center manager 106 may be optimized for large deployments with little overhead, but also support more traditional deployments that do not require automation. Using the data network center manager, for example, a user may customize network fabric deployments to meet particular business needs.

The first site 102 also includes a data center router 108 and a data center router 110. The data center router 108 and the data center router 110 serve as centralized nodes that make it possible for data to travel from one point to another point in the system 100, with the data typically travelling along the most efficient route possible. The data center router 108 and the data center router 110 may handle a large number of data streams of data travelling throughout the system 100. The first site 102 also includes a first hop router 112 via which a video camera 114 communicates via the system 100. For example, the first hop router 112 may provide an interface between the video camera 114 and the system 100. The interface may be as the "first hop" for the video camera 114 to communicate data streams to other devices connected to the system 100.

The first site 102 also includes a border leaf router 116. The border leaf router 116 may be enabled with a Layer 3 Virtual eXtensible Local Area Network (VXLAN) gateway and may perform internal inter-VXLAN routing and external routing. VXLAN is a protocol that provides a framework for overlaying virtualized layer 2 networks over layer 3 networks. VXLAN is described, for example, in RFC 7348, entitled "Virtual eXtensible Local Area Network (VXLAN): A Framework for Overlaying Virtualized Layer 2 Networks over Layer 3 Networks" and dated August 2014.

The second site 104 may have a similar architecture to the architecture of the first site 102. For example, the second site 104 may comprise a virtual local area network (vLAN) and include a data center network manager 118. The data center network manager 118 may, similar to the data center network manager 106, be a platform for a network administrator to perform fabric-oriented configuration and operations management. The data network center manager 118 may also be optimized for large deployments with little overhead, and may allow a user to customize network fabric deployments to meet particular business needs.

The second site 104 also includes a data center router 120 and a data center router 122. The data center router 108 and the data center router 110 serve as centralized nodes that make it possible for data to travel from one point to another in the system 100, typically along the most efficient route possible. The data center router 120 and the data center router 122 may handle a large number of data streams of data travelling throughout the system 100. The second site 104 also includes a last hop router 124 through which a media playback device 126 or other device may receive data via the system 100. For example, the last hop router 124 may provide an interface between the media playback device 126 and the system 100. The interface may be the "last hop" for the media playback device 126 to receive data streams from other devices connected to the system 100.

The second site 104 also includes a border leaf router 128. The border leaf router 128 may be enabled with a VXLAN gateway and perform internal inter-VXLAN routing and external routing.

The system 100 also includes a wide area network (WAN) router 130 and a WAN router 132. The WAN router 130 and the WAN router 132 may be, for example, part of a network backbone such as the Internet backbone. As a result, for example, the WAN router 130 and the WAN router 132 may not be accessible by an enterprise to glean information about how the WAN router 130 and/or the WAN router 132 are performing or how the WAN router 130 and/or the WAN router 132 are configured. For example, the WAN router 130 and the WAN router 132 may not be accessibly the enterprise to glean information about latency experienced by packets being processed by the WAN router 130 and/or the WAN router 132. On the other hand, the enterprise may control the routers at the first site 102 and at the second site 104. Thus, for example, the enterprise may be able access the data center router 108, the data center router 110, the first hop router 112, the border leaf router 116, the data center router 120, the data center router 122, the last hop router 124 and the border leaf router 128.

Some or all of the routers at the first site 102 and at the second site 104 may include an accessible table, such as the table 134 which is part of the border leaf router 116. For example, as discussed in greater detail below, the border leaf router 116 may be configured to maintain in the table 134, on a per-flow basis, an indication of the latency experienced by one or more packets of the flow from the source of the packet, such as the video camera 114, being handled by the border leaf router 116. For example, the border leaf router 116 may be configured to determine a source time for a packet received by the border leaf router 116 for processing and forwarding on to a destination device in the system 100. For example, the source time for the packet may be the time the packet left the video camera 114, based on information within the packet.

For example, each flow may be indicated by a particular source address and a particular destination address in a network layer header of the packet. For example, the source address may be an internet protocol (IP) address of a source device and the destination address may be an IP address of a destination device.

The border leaf router 116 may be configured to use the source time from the packet and a local time at which the packet is received by the border leaf router 116 to determine the latency associated with the packet. Furthermore, the border leaf router 116 may be configured to compare the latency associated with the packet to a baseline latency for the flow, to determine if the latency for the packet is above a threshold latency relative to the baseline latency. The border leaf router 116 may be configured to store, in the table 134, an indication of packets for which the border leaf router 116 has determined the latency to be above the threshold latency relative to the baseline latency. Furthermore, the border leaf router 116 may be configured to provide the indications at various intervals, such as to an application executing by one or more processors of the border leaf router 116 itself or to another device. Other devices within the system 100 may be similarly configured to determine latencies, determine if a latency is above the threshold latency relative to baseline latency for the flow at the device, and to provide indications at various intervals.

Figure 2:
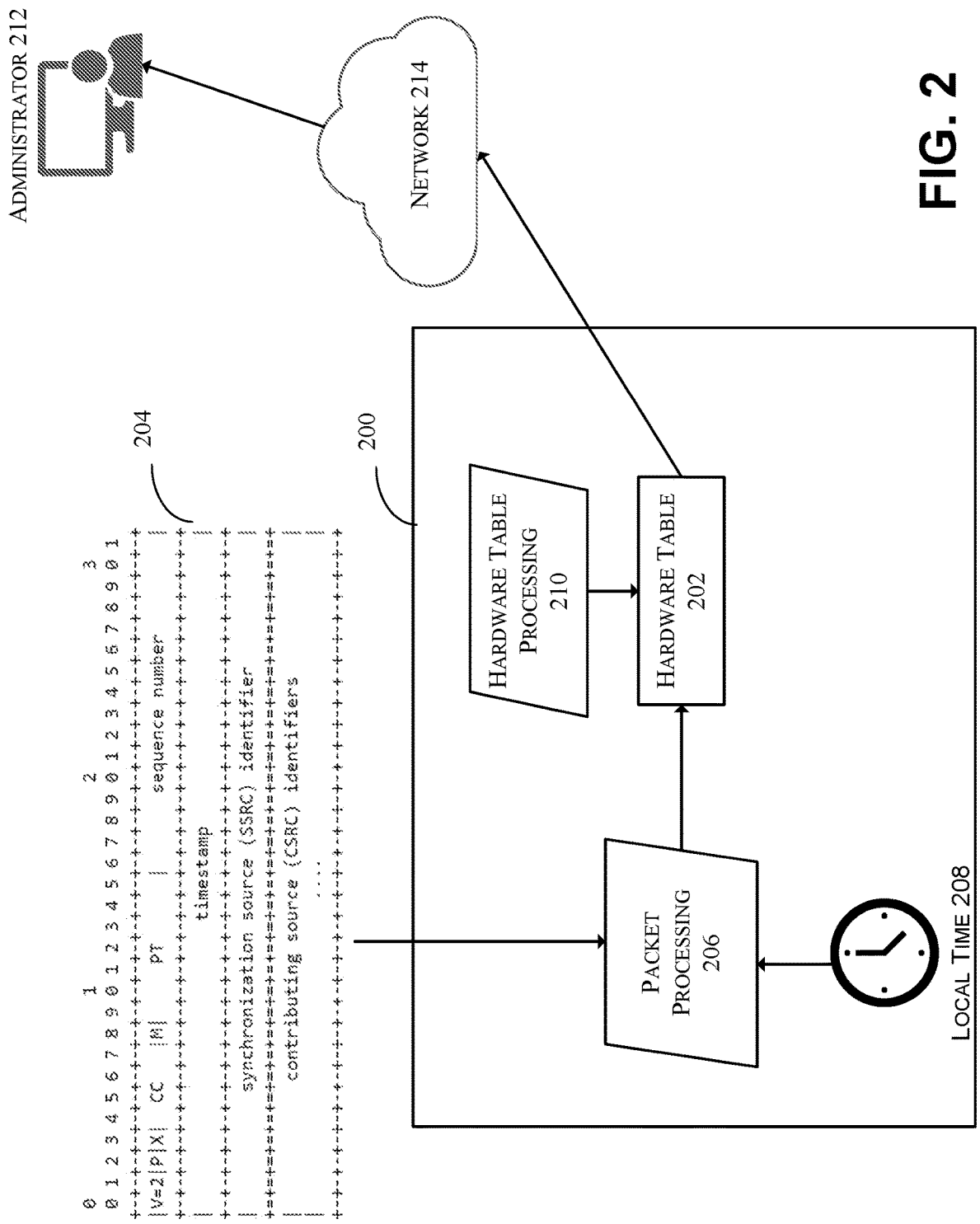
FIG. 2 illustrates an example architecture of an intermediate device configured to populate a hardware table with latency information.

FIG. 2 illustrates an example architecture of an intermediate device 200, such as the border leaf router 116, configured to populate a hardware table 202. The intermediate device 200 may populate the hardware table 202 with, for example, data such as that described with respect to the table 134. The date may include, on a per-flow basis, an indication of the latency experienced by one or more packets of the flow from the source of the packet to the intermediate device 200.

For example, a packet header 204 at a transport layer of an incoming packet may be compliant with a real-time transport protocol such as is described in RFC 3550, "RTP: A Transport Protocol for Real-Time Applications," dated July 2003. More particularly, RFC 3550 describes a header format at Section 5.1. The packet header 204, which has the header format described at Section 5.1 of RFC 3550, includes a "timestamp" field. The "timestamp" field of the packet header 204 is an indication of the source time associated with the packet, such as a time at which a first octet of the packet was sampled for transmission by a source device, such as by the video camera 114. A destination device, such as the media playback device 126, may use the values in the timestamp field of the packet header 204 to synchronize video/audio and ancillary data (which typically are multiple separate flows) and reconstruct an original packet/frame. In some examples, several consecutive packets may have equal timestamp values if the several consecutive packets are logically generated at once, such as if the consecutive packets belong to the same video frame.

With regard to the intermediate device 200, packet processing 206 of the intermediate device 200 is configured to process the time indicated by the "timestamp" field in the packet header, as well as to process a local time 208. The packet processing 206 is configured to determine a latency associated with the packet having the packet header 204. For example, the local time may be provided by a local clock that is globally synchronized with a clock that provides the time in the timestamp field in the packet header 204. The packet processing 206 of the intermediate device 200 may determine the latency for the packet by subtracting the time indicted in the timestamp field in the packet header from the local time provided by the local clock 208. The intermediate device 200 may populate the hardware table 202 with data for the packet including the determined latency.

Hardware table processing 210 of the intermediate device 200 may include processing to, for a particular period of time, determine one or more statistics indicative of jitter experienced by packets of one or more flows. The hardware table processing 210 may determine and store, for example, for each of one or more flows being handled by the intermediate device, an indication of jitter experienced by packets of that flow between the source device for the flow and the intermediate device 200. The intermediate device 200 may report the jitter indications, in association with an indication of the corresponding flow for each jitter indication, to an administrator 212 via a network 214 such as the Internet.

The administrator 212, receiving such jitter indication reports from multiple intermediate devices, may determine from the jitter indications how particular intermediate devices are contributing to jitter of each flow. For example, for a flow that is experiencing jitter, the administrator 212 may determine the first intermediate device in the flow, in the direction of packets progressing from a source device to a destination device, that is evidencing jitter for the flow. With such a determination, for example, this may lead the administrator to more easily home in on which particular intermediate devices to examine as a potential cause of jitter issues with the flow.

Figure 3:
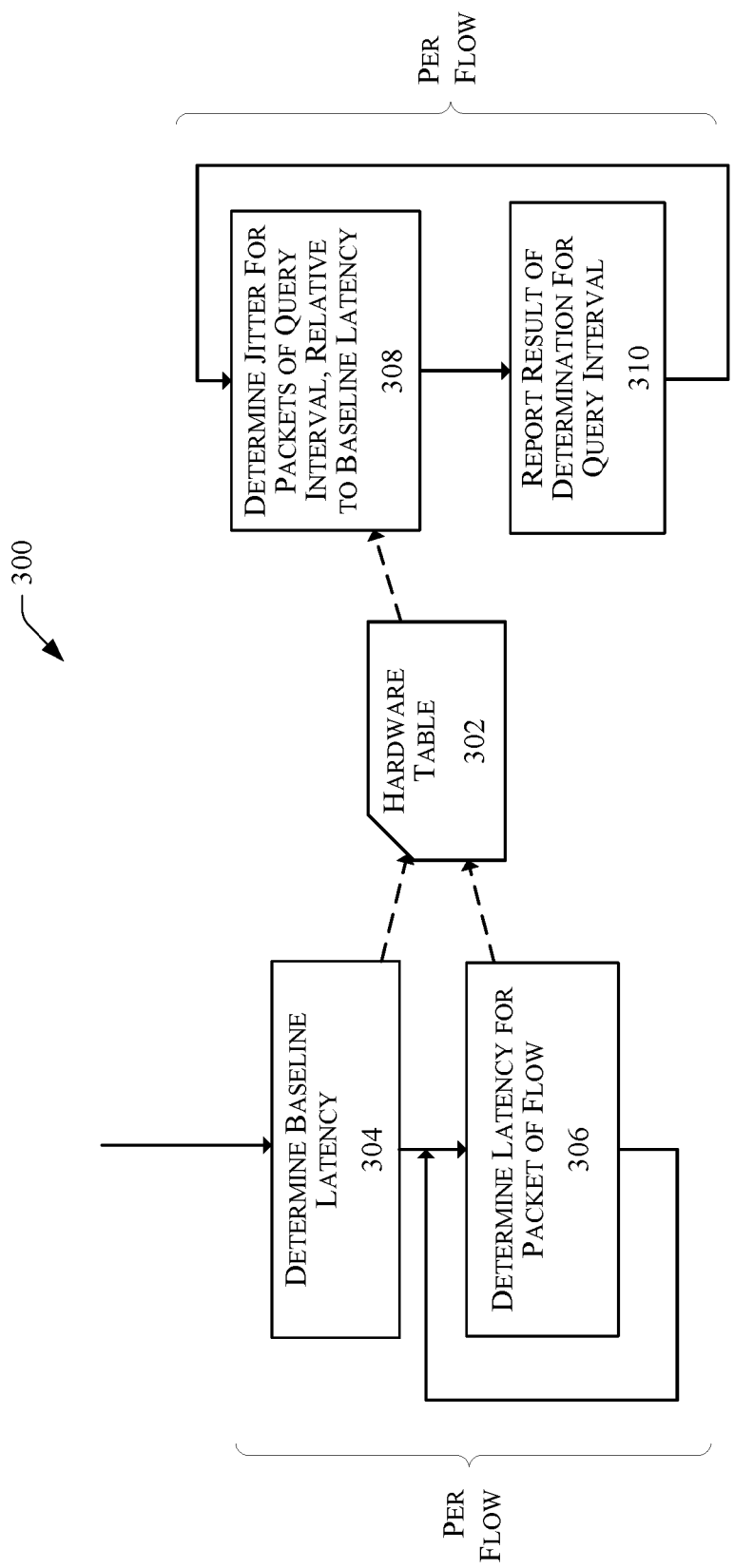
FIG. 3 illustrates processing that hardware table processing of an intermediate device may include.

FIG. 3 illustrates processing 300 that the hardware table processing 210 of an intermediate device 200 may include. As shown in FIG. 3, the intermediate device may include a hardware table 302. The processing 300 performed by the intermediate device may include performing an operation 304 and an operation 306 on a per-flow basis. At the operation 304, the intermediate device may determine a baseline latency for a particular flow. For example, at the operation 304, the intermediate device may determine the latency for a number of packets of a flow, such as consecutive packets of a flow, and determine the baseline latency for the flow to be an average of the latencies thus determined. In one example, the baseline latency for the flow may be a mean of the latencies determined. In some examples, the mean may be determined after discarding outlying determined latencies, such as latencies that are below the tenth percentile of determined latencies and determined latencies that are above the ninetieth percentile of the determined latencies. The operation 304 may include storing the determined baseline latency in the hardware table 302.

The intermediate device may perform an operation 306 that includes, after determining the baseline latency at operation 304, determining a latency for a packet of the flow, such as a subsequent packet of the flow. For example, the operation 306 may include determining a latency associated with the packet by processing a time indicated by a "timestamp" field in a packet header, as well as a local time that may be provided by a local clock that is globally synchronized with a clock that provides the time in the timestamp field in the packet header. The intermediate device may, at the operation 306, determine the latency for the packet by subtracting the time indicated in the timestamp field in the packet header from the local time provided by the local clock. The operation 306 may include populating the hardware table 302 with data for the packet including the determined latency. The intermediate device may repeat the operation 306 for each of some or all of packets of the flow, such as for each of some or all of subsequent packets of the flow.

The processing 300 performed by the intermediate device may further include performing an operation 308 and an operation 310 at each of a number of intervals, such as at each of a number of query intervals, on a per-flow basis. A query interval may be, for example, an interval for which the intermediate device makes jitter indication reports to an administrator via a network. At the operation 308, the intermediate device may determine an indication of jitter for packets of a particular flow, of the query interval, relative to the baseline latency determined for the flow. For example, at the operation 308, the intermediate device may determine, for each packet of the query interval, a difference between the latency for the packet and the determined baseline latency for the flow to which the packet belongs.

At the operation 308, the intermediate device may build a report for the query interval, for the flow, that includes all of the determined differences. In some examples, the operation 308 may include processing to determine one or more statistics that represents the determined differences, such as in a condensed manner. In one example, the reported jitter indication for the query interval, for the flow, may be a mean of the determined latency differences. In some examples, the mean may be determined after discarding outlying determined differences, such as differences that are below the tenth percentile of determined differences and differences that are above the ninetieth percentile of the determined differences.

Figure 4:
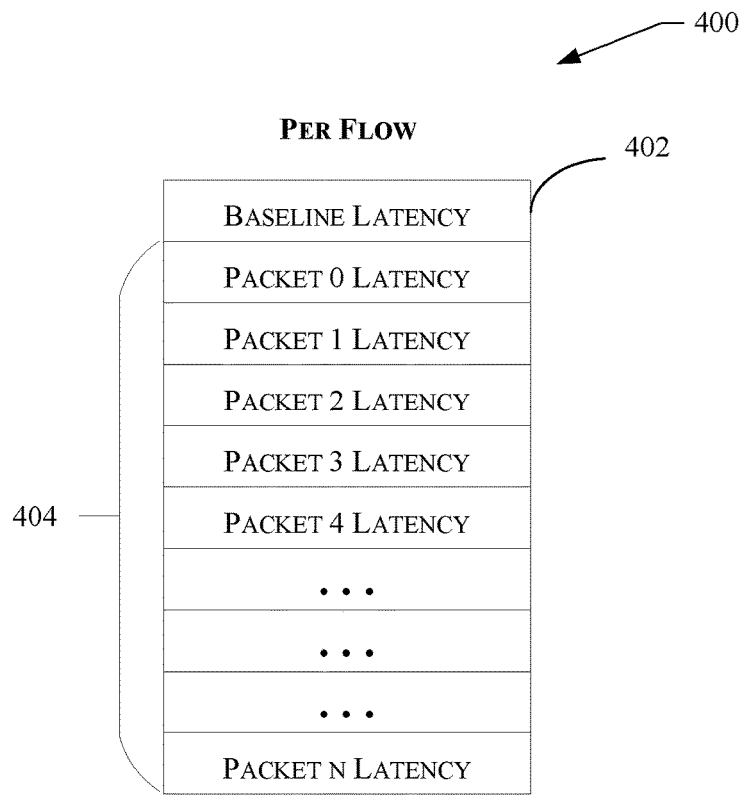
FIG. 4 illustrates an example portion of a hardware table, as may be populated by an intermediate device performing various operations.

FIG. 4 illustrates an example portion 400 of a hardware table, such as the hardware table 302, as may be populated by an intermediate device performing the operation 304 and the operation 306. For example, an intermediate device performing the operation 304 may determine a baseline latency for a flow. The intermediate device may populate a field 402 in the portion 400 of the hardware table with the baseline latency the intermediate device determines for the flow. In some examples, the intermediate device determines the baseline latency, to populate the field 402, when a flow is initialized and after the flow is stabilized, and the intermediate device utilizes that baseline latency over multiple query intervals. For example, in an initialization phase of establishing a flow, the source device and the destination device may exchange handshake messages to establish communication, such as according to a communication protocol. The intermediate device may determine the baseline latency after this initialization phase and while payload data is being communicated from the source device to the destination device, via the intermediate device.

The intermediate device, performing the operation 306 relative to a particular flow, may determine the packet latency for each of a number of packets of the flow, such as packets subsequent to the packets that are utilized to determine the baseline latency. The intermediate device may populate entries 404 of the example portion 400 of the hardware table. For example, the intermediate device may determine the packet latency for each packet of a portion of the flow or the intermediate device may determine the packet latency for only some packets of a portion of the flow, such as to determine a sampling of packet latencies.

Furthermore, the intermediate device may populate entries 404 of the example portion 400 of the hardware table for each determined latency or the intermediate device may populate entries 404 of the example portion 400 of the hardware table for only some of the determined latencies. For example, the intermediate device may, in some example, populate entries 404 of the example portion 400 of the hardware table for determined latencies that are outside a threshold relative to the baseline latency. The intermediate device may populate entries 404 of the example portion 400 of the hardware table to include an indication of a packet to which the determined latency corresponds, such as a sequence number for the packet as indicated in the packet header 204.

Figure 5:
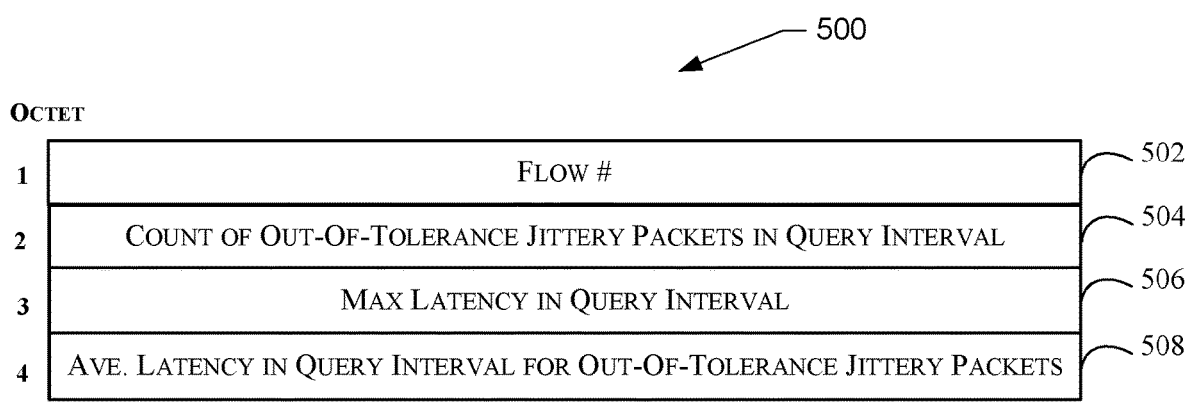
FIG. 5 illustrates an example message, such as a message that hardware table processing may generate to report jitter indications, in association with an indication of the corresponding flow for each jitter indication, to an administrator via a network such as the Internet.

FIG. 5 illustrates an example message 500, such as a message that the hardware table processing 210 may generate to report jitter indications, in association with an indication of the corresponding flow for each jitter indication, to an administrator 212 via a network 214 such as the Internet. The message 500 includes a flow number in a first octet 502. The flow number indicates, at least in part, a source device and destination device for packets being processed by the intermediate device. For example, the flow number in the first octet 502 may be related to a pair of IP addresses—the IP address of the source device and the IP address of the destination device.

The message 500 also includes, in a second octet 504, a count of out-of-tolerance jittery packets in a query interval. The query interval, which may be a reporting interval, is an interval of time to which the data in the message 502 may pertain. For example, the hardware table processing 210 may determine, for each packet, whether the latency exceeds a baseline latency for the flow by a threshold amount, which may be a predetermined threshold amount. The threshold amount may, for example, increase for intermediate devices that are further from a source device. In such a situation that the latency exceeds the baseline latency for the flow by the threshold amount, the hardware table processing 210 may increment a count of the out-of-tolerance jittery packets and provide this count, for the query interval, in the second octet 504 of the message 500.

The message 500 also includes, in a third octet 506, an indication of the maximum latency determined for a packet of the flow during the query interval. For example, the hardware table processing 210 may determine, for packets of the flow that it processes during the query interval, a latency value for each of the packets. The hardware table processing 210 may further determine, for the determined latency values, a maximum one of the latency values. The hardware table processing 210 may include this maximum latency value in the third octet 506 of the message 500. In some examples, this maximum latency value may be adjusted to account for the threshold latency, such as by subtracting the threshold latency value for the flow, for the intermediate device, from the determined latency value.

The message 500 also includes, in a fourth octet 508, an indication of average latency in the query interval for out-of-tolerance jittery packets. For example, the hardware table processing 210 may determine, for packets of the flow that it processes during the query, an average latency value for those packets determined to have latency exceeding a baseline amount (e.g., for the packets indicated in the count of out-of-tolerance jittery packets in the second octet 504). In some examples, this average latency value may be adjusted to account for the threshold latency, such as by subtracting the threshold latency value for the flow, for the intermediate device, from the determined average latency value for the packets determined to have latency exceeding the baseline amount. In other examples, other the hardware table processing determines for the out-of-tolerance jittery packets may be included, in the fourth octet 508, in addition to or instead of the average latency value.

Figure 6:
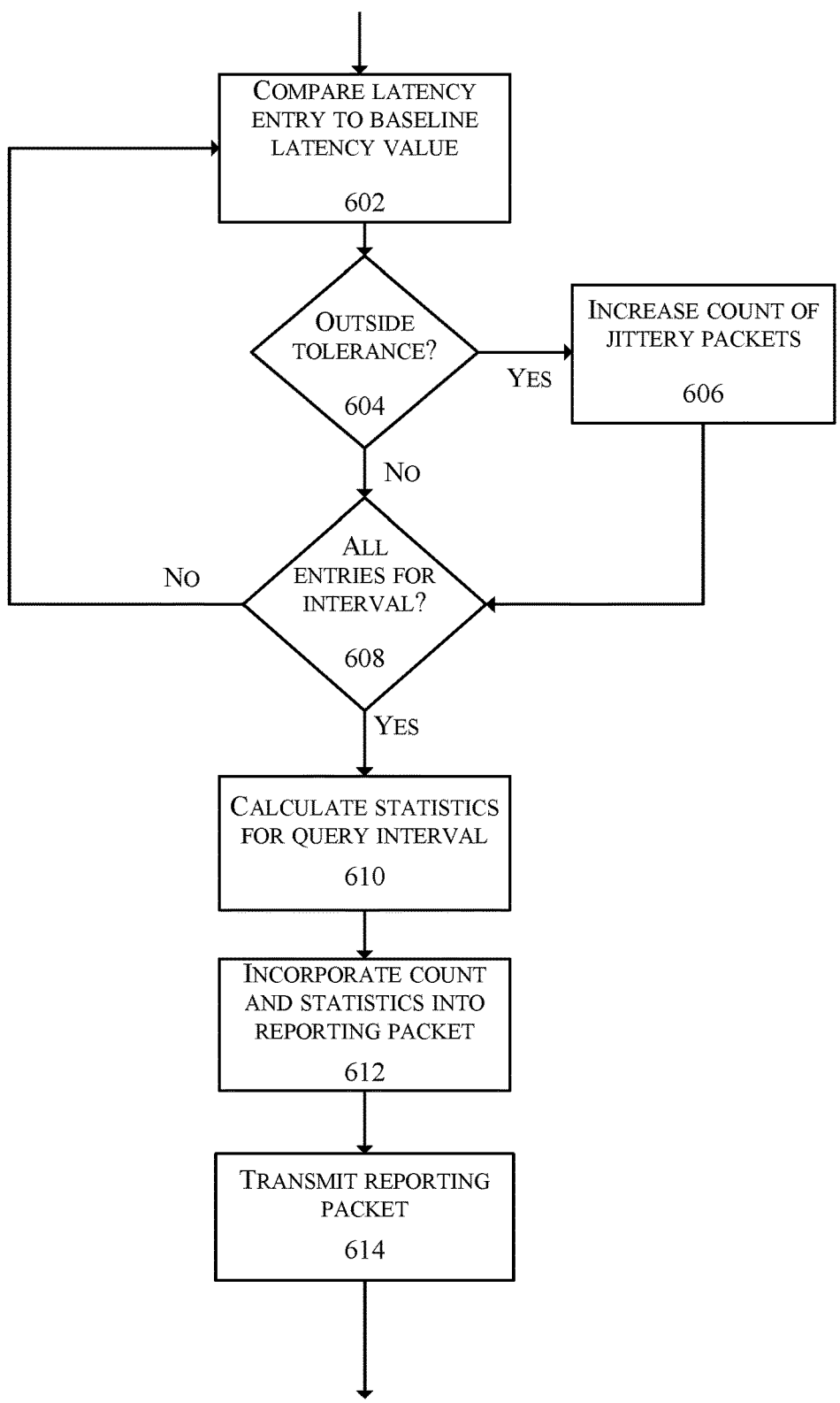
FIG. 6 is a flowchart illustrating an example process that may be hardware table processing an intermediate device may perform to generate a packet for a query interval.

FIG. 6 is a flowchart illustrating an example process 600. The example process 600 may be the hardware table processing 210 that, for example, an intermediate device may perform to generate the example packet 500, for a query interval. At 602, the intermediate device compares the latency value for a packet, such as a latency value determined by the packet processing 206, to the baseline latency. For example, referring back to the FIG. 4 example portion 400 of a hardware table, the packet may be the Packet 1, and the intermediate device may compare the latency value for the Packet 1, in the portion 404, to the baseline latency value in the field 402.

At 604, the intermediate device determines if the latency value for the packet is outside a tolerance. For example, the intermediate device may determine if the latency value for the packet exceeds the baseline latency for the flow by a threshold amount. If the intermediate device determines the latency value for the packet is outside the tolerance, then the intermediate device increases the count of jittery packets, at 606. For example, the intermediate device may increase the count value to be provided in the second octet 504 of the reporting packet 500.

If the intermediate device determines the latency value for the packet is not outside the tolerance, then the intermediate device proceeds to operation 608. The intermediate device also proceeds to the operation 608 after the operation 606. At 608, the intermediate device determines if the intermediate device has processed all latency entries for the query interval. If no, then the intermediate device goes back to operation 602, to process the next latency entry for the query interval.

Otherwise, at 610, the intermediate device calculates statistics for the query interval. For example, the intermediate device may calculate the maximum latency for the query interval, which may or may not be adjusted by a threshold value for the flow, for the intermediate device.

At 612, the intermediate device incorporates the count value and the statistics into a reporting packet for the flow, for the query interval. The intermediate device may also incorporate an indication of the flow into the reporting packet. The reporting packet may have a format like the packet 500, for example. At 614, the intermediate device transmits the reporting packet. The intermediate device may transmit the reporting packet to a central location via a network, such as to the administrator 212 via the network 214.

In some examples, a portion or all of the process 600 may be carried out at a central location or otherwise off the intermediate device. For example, the intermediate device may determine information from which another device may carry out a portion of all of the process 600. For example, the intermediate device may populate the table portion 400 and may provide the information, which may be the table portion 400, to the central location or other location off the intermediate device. The intermediate device may not even include the determined baseline latency in the provided information but instead may include an indication of latencies for packets from which the baseline latency may be determined by the other device.

Figure 7:
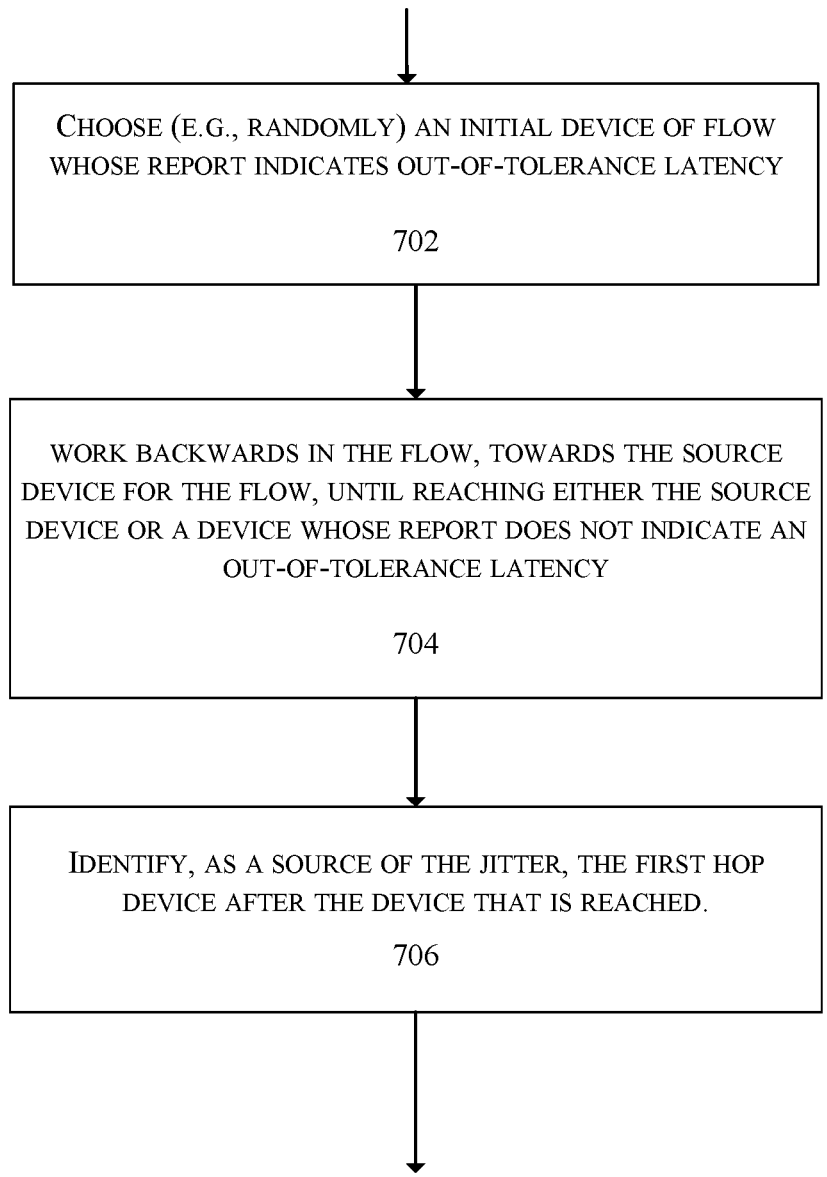
FIG. 7 is a flowchart illustrating an example process to pinpoint a source of jitter in a flow.

FIG. 7 is a flowchart illustrating an example method by which one or more processors at the central or other location may execute operations to pinpoint the intermediate device in a flow that is causing the jitter for that flow. At 702, the one or more processors may choose (e.g., randomly) an initial intermediate device to consider, of one of the intermediate devices of the flow whose report indicates out-of-tolerance latency. At 704, the one or more processors works backwards in the flow, towards the source device for the flow, until reaching either the source device or a device whose report does not indicate an out-of-tolerance latency. At 706, the one or more processors identifies the next-hop device, after the device that is reached, as a device that is causing the jitter for that flow.

Figure 8:
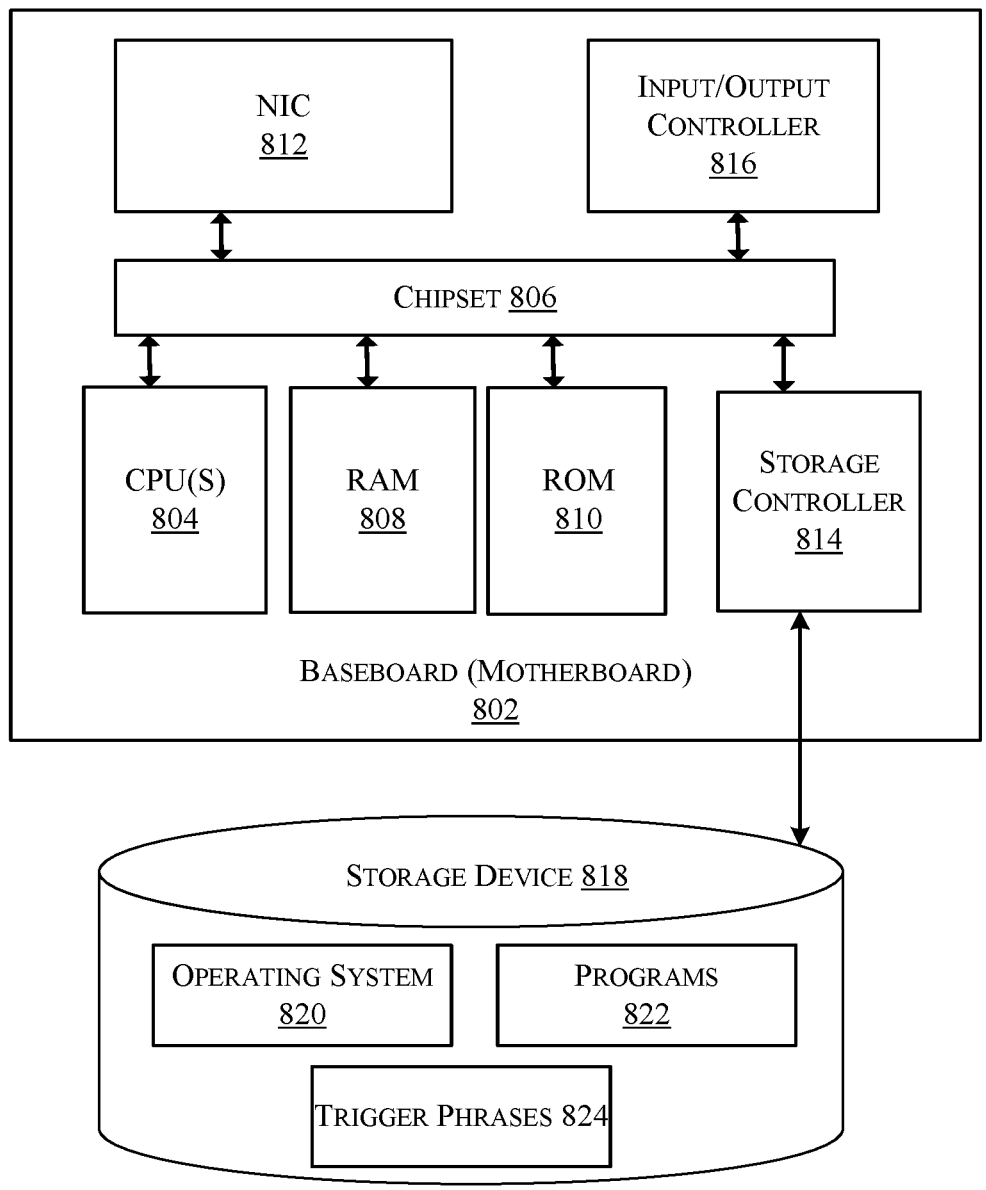
FIG. 8 illustrates an example computer architecture for a computer capable of executing program components for implementing the functionality described herein.

FIG. 8 illustrates an example computer architecture for a computer 800 capable of executing program components for implementing the functionality described above. The computer architecture shown in FIG. 8 illustrates an architecture of a server computer, workstation, desktop computer, laptop, tablet, network appliance, e-reader, smartphone, network switch, or other computing device, and can be utilized to execute any of the software components presented herein. The computer 800 may, in some examples, correspond to a network infrastructure device discussed herein.

The computer 800 includes a baseboard 802, or "motherboard," which may be a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be, for example, standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein. As illustrated in FIG. 8, the ROM 810 or NVRAM can also store data usable by the computer 800 to generate and/or process attestation information in messages exchanged among the computer 800 and other devices. In other examples, this data may be stored elsewhere, such as in RAM 808.

The computer 800 can operate in a networked environment using logical connections to remote computing devices and computer systems through a network. For example, the chipset 806 can include functionality for providing network connectivity through a Network Interface Controller (NIC) 812, such as a gigabit Ethernet adapter. The NIC 812 can connect the computer 800 to other computing devices over a network. It should be appreciated that multiple NICs 812 can be present in the computer 800, connecting the computer to other types of networks and remote computer systems. In some instances, the NICs 812 may include at least one ingress port and/or at least one egress port. An input/output controller 816 may be provided for other types of input/output.

The computer 800 can be connected to a storage device 818 that provides non-volatile storage for the computer. The storage device 818 can store an operating system 820, programs 822, and data 824, for example. The storage device 818 can be connected to the computer 800 through a storage controller 814 connected to the chipset 806. The storage device 818 can include one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The data 824 may include, for example, latency value an intermediate device determines for packets of a flow, such as on a per-flow basis. The data 824 may also include one or more baseline values for various flow being handled by an intermediate device. The data 824 may also include statistics the intermediate device calculates for query intervals, such as on a per-flow basis. The data 824 may include, for example, one or more reporting packets into which an intermediate device incorporates count and statistics values, such as on a per-flow basis.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like. For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the storage device 818 described above, the computer 800 can have access to other computer-readable storage media to store and retrieve information, such as program modules, data structures, or other data, including data to generate and/or process attestation information. It should be appreciated by those skilled in the art that computer-readable storage media is any available media that provides for the non-transitory storage of data and that can be accessed by the computer 800.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method to process timing information of flows in a network, comprising:
    receiving, at a first device, one or more packets of a flow, the one or more packets having a Real-time Transport Protocol (RTP) header including a source time stamp that indicates a time at which the one or more packets were generated, the first device being at a first location;
    determining, using the source time stamp and a first local time at the first device, a first latency associated with the one or more packets of the flow passing through the first device;
    receiving, at a second device, the one or more packets of the flow;
    determining, using the source time stamp and a second local time at the second device, a second latency associated with the one or more packets passing through the second device, the second device being at a second location;
    determining that jitter was increased in the flow between the first location and the second location based at least in part on the second latency being greater than the first latency;
    identifying an intermediate device located at a third location along a network path between the first location and the second location;
    determining that the intermediate device caused the increased jitter based at least in part on the jitter increasing in the flow between the first and second locations and the intermediate device being at the third location between the first and second locations; and
    providing a message to an administrator associated with the network path indicating that the intermediate device is causing jitter in the network path.

2. The method of claim 1, wherein:
    determining the first latency is based at least in part on a source time stamp in the one or more packets and a time associated with the first device; and
    the method further includes storing, in association with an indication of the flow, an indication of the first latency for the one or more packets.

3. The method of claim 2, further comprising:
    performing deep packet inspection on the one or more packets to determine the source time stamp in the one or more packets.

4. The method of claim 1, wherein:
    providing the message includes transmitting the message to an administration device via a second network.

5. The method of claim 1, further comprising:
determining statistics characterizing the first latency determined for the one or more packets, where the one or more packets are packets of a query interval.

6. The method of claim 1,
wherein identifying the intermediate device includes determining which of a plurality of devices in the network handling the flow and is causing jitter in the flow.

7. A system comprising:
one or more processors; and
one or more non-transitory computer-readable media storing computer-executable instructions that, when executed by the one or more processors, cause the one or more processors to perform operations including:
receiving, at a first device, one or more packets of a flow, the one or more packets having a Real-time Transport Protocol (RTP) header including a source time stamp that indicates a time at which the one or more packets were generated the first device being at a first location;
determining, using the source time stamp and a first local time at the first device, a first latency associated with the one or more packets of the flow passing through the first device;
receiving, at a second device, the one or more packets of the flow;
determining, using the source time stamp and a second local time at the second device, a second latency associated with the one or more packets of the flow passing through the second device, the second device being at a second location;
determining that latency was increased in the flow between the first location and the second location based at least in part on the second latency being greater than the first latency;
identifying an intermediate device located at a third location along a network path between the first location and the second location;
determining that the intermediate device caused the increased latency based at least in part on the latency increasing in the flow between the first and second locations and the intermediate device being at the third location between the first and second locations; and
providing a message to an administrator associated with the network path indicating that the intermediate device is causing jitter in the network path.

8. The system of claim 7, the operations further include storing, in association with an indication of the flow, an indication of the first latency for the one or more packets.

9. The system of claim 8, the operations further comprise:
performing deep packet inspection on the one or more packets to determine the source time stamp in the one or more packets.

10. The system of claim 7, wherein:
providing the message includes transmitting the message to an administration device via a second network.

11. The system of claim 7, further comprising:
determining statistics characterizing the first latency determined for the one or more packets, where the one or more packets are packets of a query interval.

12. The system of claim 7, further comprising:
wherein identifying the intermediate device includes determining which of a plurality of devices in the network handling the flow and is causing jitter in the flow.

13. One or more non-transitory computer-readable storage media storing computer-readable instructions that, when executed, instruct a processing unit of a subscribing node in a network to perform operations comprising:
receiving, at a first device, one or more packets of a flow, the one or more packets having a Real-time Transport Protocol (RTP) header including a source time stamp that indicates a time at which the one or more packets were generated;
determining, using the source time stamp and a first local time at the first device, a first latency associated with the one or more packets of the flow passing through the first device, the first device being at a first location;
receiving, at a second device, the one or more packets of the flow;
determining, using the source time stamp and a second local time at the second device, a second latency associated with the one or more packets of the flow passing through the second device, the second device being at a second location;
determining that latency was increased in the flow between the first location and the second location based at least in part on the second latency being greater than the first latency;
identifying an intermediate device located at a third location along a network path between the first location and the second location;
determining that the intermediate device caused the increased latency based at least in part on the latency increasing in the flow between the first and second locations and the intermediate device being at the third location between the first and second locations; and
providing a message to an administrator associated with the network path indicating that the intermediate device is causing jitter in the network path.

14. The one or more non-transitory computer-readable storage media of claim 13, the operations further comprising storing, in association with an indication of the flow, an indication of the first latency for the one or more packets.

15. The one or more non-transitory computer-readable storage media of claim 14, the operations further comprising:
performing deep packet inspection on the one or more packets to determine the source time stamp in the one or more packets.

16. The one or more non-transitory computer-readable storage media of claim 13, wherein:
providing the message includes transmitting the message to an administration device via a second network.

17. The one or more non-transitory computer-readable storage media of claim 13, the operations further comprising:
determining statistics characterizing the first latency determined for the one or more packets, where the one or more packets are packets of a query interval.

18. The system of claim 7, the operations further comprising:
storing a flow entry in a hardware flow table of the first device, the flow entry comprising:
a five-tuple associated with the flow;
a first packet timestamp associated with a first packet in an interval the flow; and
a second packet timestamp associated with a last packet in the interval in the flow.

19. The system of claim 7, wherein the flow is a transmission of a live media streaming application.

20. The method of claim 1 wherein, the intermediate device is unknown to the administrator and not controlled by the administrator.

\* \* \* \* \*